G. A. STANFIELD AND C. SCROGGIN.
THRESHING MACHINE.
APPLICATION FILED MAY 15, 1920.
1,350,085.
Patented Aug. 17, 1920.
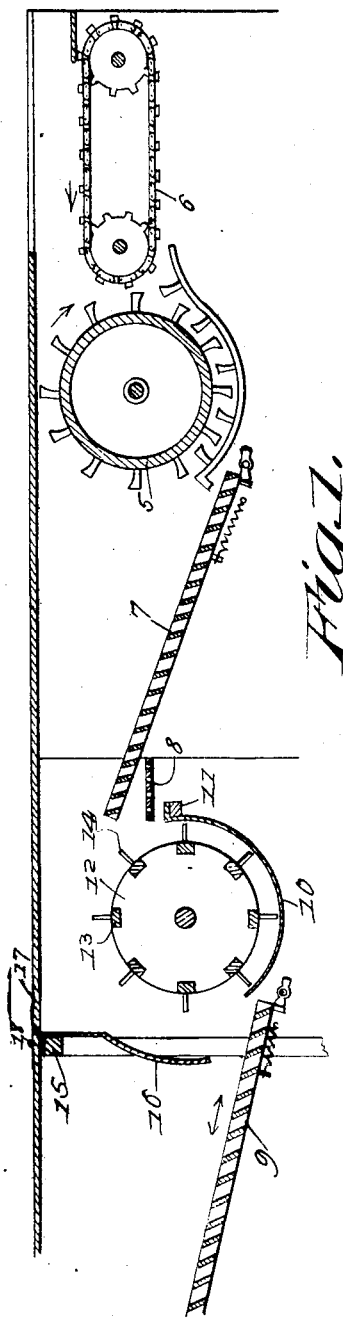
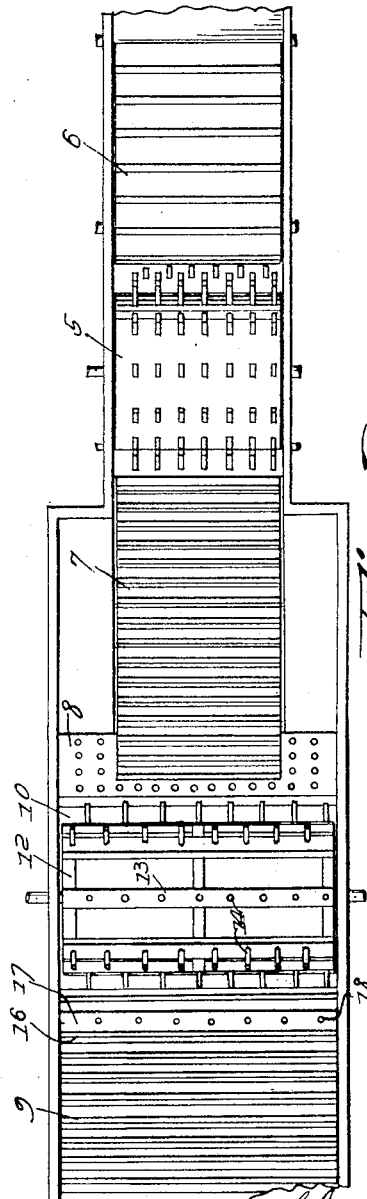
Inventors
Charles Scroggin
George A. Stanfield,
By
Attorney

UNITED STATES PATENT OFFICE.

GEORGE A. STANFIELD AND CHARLIES SCROGGIN, OF LAKE CITY, IOWA.

THRESHING-MACHINE.

1,350,085.  Specification of Letters Patent.  Patented Aug. 17, 1920.

Application filed May 15, 1920. Serial No. 381,582.

*To all whom it may concern:*

Be it known that we, GEORGE A. STANFIELD and CHARLIES SCROGGIN, citizens of the United States of America, and residents of Lake City, in the county of Calhoun and State of Iowa, have invented certain new and useful Improvements in Threshing-Machines, of which the following is a specification.

This invention relates to threshing machines and particularly to a means for increasing the production resulting from the treatment of grain bearing straw, the said invention having for its object the provision of novel means for agitating the straw being carried from the threshing cylinder or cylinders to the stacker, novel means being provided for causing agitation of the straw so that grain will be dislodged and recovered.

A still further object of this invention is to produce a straw agitating device coupled with or coacting with a baffle which limits the travel of the straw being agitated so that the dislodged grain may be directed to a collecting medium such as is usually present in threshing machines for directing the recovered grain to the bagger or other outlet, and whereby the straw may be directed to a rack for carrying it rearwardly to the stacker.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a sectional view of the interior of a threshing machine, and Fig. 2 illustrates a top plan view thereof.

It is to be understood in connection with this illustration that a conventional showing only is attempted with respect to the threshing cylinder and its coacting concave or breast, and that the racks and other parts of the threshing machine such as the sieves, blower and carriers may be those of ordinary types, as one skilled in the art will understand. A detailed illustration, therefore, of the features mentioned being unnecessary to an understanding of the invention by one skilled in the art, is omitted or shown conventionally.

The threshing cylinder 5, the grain feeder 6, the rack 7 and the sieve 8 may be of any ordinary construction, and the rack 9 which may convey straw to the stacker, is such that it will accomplish the results of conveying or carrying the straw to the rear of the threshing machine, but the invention comprises a mechanism interposed between the threshing cylinder and the stacker for agitating the straw violently for the purpose of dislodging the grain. The mechanism which we employ as an embodiment of a form of the invention consists of a concave plate 10 having one end anchored to a bar or sill 11, the said plate being held under the cylinder 12 provided with bars 13 having teeth 14, the said cylinder being rotatably mounted in the housing or frame of the threshing machine at the rear of one of the racks for the purpose of receiving the straw from the rack. The interior of the threshing machine has an upstanding frame 15 from which an apron or baffle plate 16 is suspended, the upper end of the said plate preferably having a flange 17 over-lying the frame, and the said flange may be secured to the frame in any appropriate manner by fastenings 18 such as nails, screws or the like.

As shown, the baffle plate 16 is curved and its lower end is above the rack 9 so that after the straw has been arrested by the baffle plate, it will find its way to the rack and be carried to the stacker or to the conveyer in the rear which may carry the straw from the interior of the threshing machine. As the straw is violently agitated and thrown against the bafflle plate by the rotation of the cylinder 12, any grain which might have been in the straw will be dislodged and will fall through the rack 9 or between the rack and the plate 10 to suitable screening or gathering devices which are present in machines of this type.

The inventors do not wish to be limited with respect to the construction of the cylinder 12 as it deals with the presence of the bars 13, although the agitating teeth or equivalents thereof are essential features of the invention, as they coact with the mechanism for agitating the straw and throwing it against the baffle plate with considerable force for the purpose of effecting the dislodgment of the grain.

As is usual in the construction of threshing machines, that part of the machine at the rear of the threshing cylinder is usually wider than the threshing cylinder and it is the purpose of these inventors to have the cylinder 12 extend the full width of the thresher casing and the full width of the racks so that the straw will be spread over a larger area at the rear of the threshing cylinder, and that will also aid in the dislodging of the loose grain.

We claim:

In a threshing machine, a threshing mechanism, a rack to which the threshing mechanism delivers straw, a concave plate supported at the rear of the rack, an agitating cylinder mounted for rotation with relation to the plate and whereby the periphery above the axis rotates away from the outer end of the said rack and whereby the periphery above the axis is approximately on a horizontal plane with the outer end of the said rack, a baffle plate supported above the plane of the outer end of the rack and depending below the axis of the shaft of the cylinder, and a rack under the baffle plate and below the plane of the axis of the shaft of the cylinder.

GEORGE A. STANFIELD.
CHARLIES SCROGGIN.